United States Patent [19]
Forsberg

[11] 3,724,136
[45] Apr. 3, 1973

[54] SELF ADJUSTING WINDOW TRIM
[76] Inventor: Albert G. Forsberg R.R. Theodosia, Mo. 65761
[22] Filed: Sept. 30, 1970
[21] Appl. No.: 77,176

[52] U.S. Cl. .................................. 49/505, 52/212
[51] Int. Cl. ................................................. E06b 1/04
[58] Field of Search ................... 49/505; 42/212, 217

[56] References Cited
UNITED STATES PATENTS 2,672,959  3/1954  Young .................................. 52/212
2,912,078  11/1959  Kiehl et al. .......................... 52/212

*Primary Examiner*—Kenneth Downey
*Attorney*—Edward A. Boeschenstein and William G. Burns

[57] ABSTRACT

Inside and outside trim for metal and plastic windows which can be adjusted to fit with self adjusting means to keep proper fit thereafter.

2 Claims, 6 Drawing Figures

PATENTED APR 3 1973  3,724,136

INVENTOR.
ALBERT GENE FORSBERG

SELF ADJUSTING WINDOW TRIM

SUMMARY OF THE INVENTION

Plastic or metal windows mounted in a frame with a flange held between siding and boxing are provided with exterior and interior metal or plastic inner and outer trim members which can be secured adjustably in position. Spring means provides a self adjusting action thereafter.

DETAILED DESCRIPTION OF PREFERRED EMBODIMENTS

Figure 1:
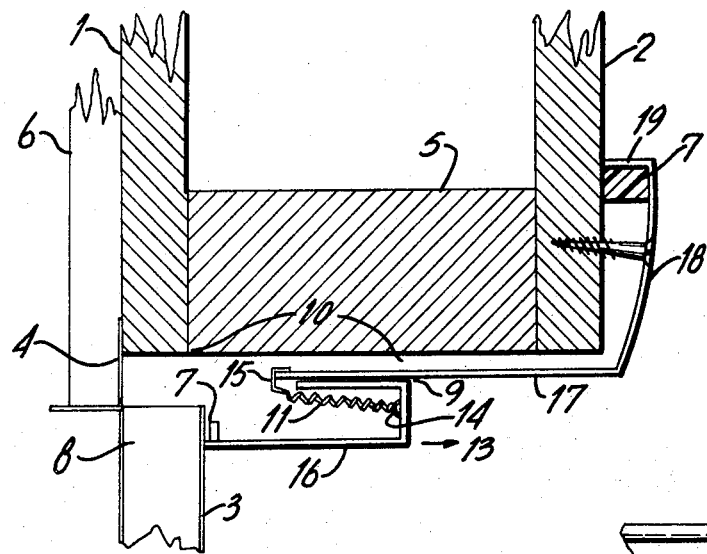
FIG. 1 is a side view of one form of my invention in use viewed downward from top of right side.
Figure 2:
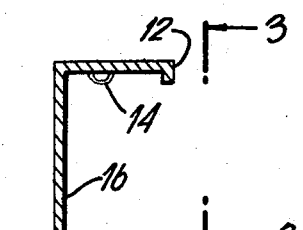
FIG. 2 shows in cross section one of the parts used in FIG. 1.
Figure 3:
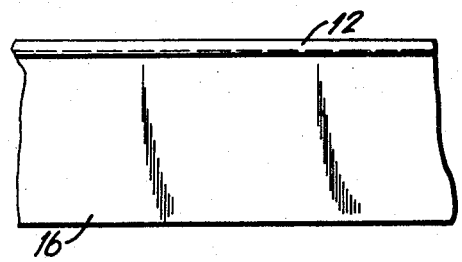
FIG. 3 is a view taken along line 3—3 in FIG. 2.
Figure 4:
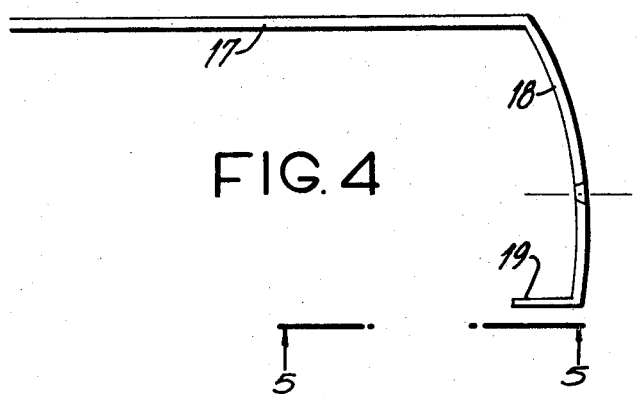
FIG. 4 is a cross section of another one of the parts used in FIG. 1.
Figure 5:
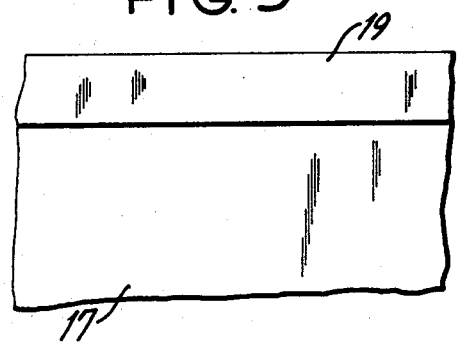
FIG. 5 is a view taken along line 5—5 in FIG. 4.

Referring now to FIGS. 1-5, a window 8 is disposed in a frame 3 with a flange 4 extending between siding 6 and boxing 1. An inner trim member 16 of metal or plastic having in cross section the shape of an L with a lip 12 and an eyelet 14 has one edge supporting rubber gasket 7 and bearing against frame 3.

Boxing 1 is spaced from interior wall 2 by stud 5. An outer trim member 18 of metal or plastic has one elongated surface 17 parallel to one side of member 16 and sealed thereto with a clear slicon seal 9. A spring 11 has one end secured to eyelet 14 and an opposite end having an end cap 15 bearing against an edge of member 18. The curved edge of member 18 extends around the interior wall with a lip 19. Additional rubber gasket 7 extends parallel to and in contact with the lip 19 as well as with the interior wall 2.

Figure 6:
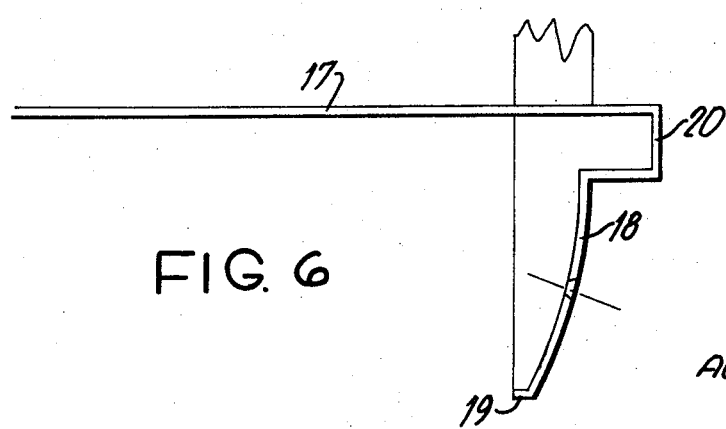
FIG. 6 is a cross section of a modified part used in the structure of FIG. 1.

FIG. 6 shows a modification of member 18 wherein surface 17 is provided with a right angle bend as shown at 20.

While I have described my invention with particular reference to the drawings, such is not to be considered as limiting its actual scope.

Having thus described this invention, what is asserted as new is:

1. In a wall having a window opening into which a window is set to close the opening; a trim for concealing the wall surface at the periphery of the opening, said trim comprising: an outer trim member attached to the wall and extending along the wall surface at the periphery of the opening, the outer trim member including an inside portion which projects generally outwardly away from the window and extends along and conceals the wall surface at the periphery of the window opening, and a flange portion which is attached to the inside portion and conceals the edge of the window opening, the outer trim member being attached to the wall at the flange portion; an inner trim member positioned within the outer trim member along the inside portion thereof, the inner trim member abutting the window and being shiftable inwardly and outwardly with respect to the outer trim member, the inner trim member including a first portion which is spaced inwardly from the inside portion of the outer trim member and projects away from the window, and a second portion which is connected to that end of the first portion located furthest from the window and extends toward the inside portion of the outer trim member so as to close the space between the first portion of the inner trim member and the inside portion of the outer trim member; and a spring connected between the inner and outer members for urging the inner trim member against the window, one end of the spring being attached to the inside portion of the inner trim member.

2. The structure according to claim 1 wherein the other end of the spring is attached to the end of the inside portion located closest to the window.

* * * * *